Jan. 23, 1951 G. R. CLARK 2,538,829

MULTIPLEX TELEGRAPH SYSTEM USING FREQUENCY DISCRIMINATION

Filed April 21, 1945 2 Sheets-Sheet 1

INVENTOR
GILBERT R. CLARK.
BY H.G. Grover
ATTORNEY

INVENTOR
GILBERT R. CLARK.
BY H. S. Grover
ATTORNEY

Patented Jan. 23, 1951

2,538,829

UNITED STATES PATENT OFFICE 2,538,829

MULTIPLEX TELEGRAPH SYSTEM USING FREQUENCY DISCRIMINATION

Gilbert R. Clark, Staten Island, N. Y., assignor to Radio Corporation of America, a corporation of Delaware Application April 21, 1945, Serial No. 589,480

2 Claims. (Cl. 178—51)

Figure 1:
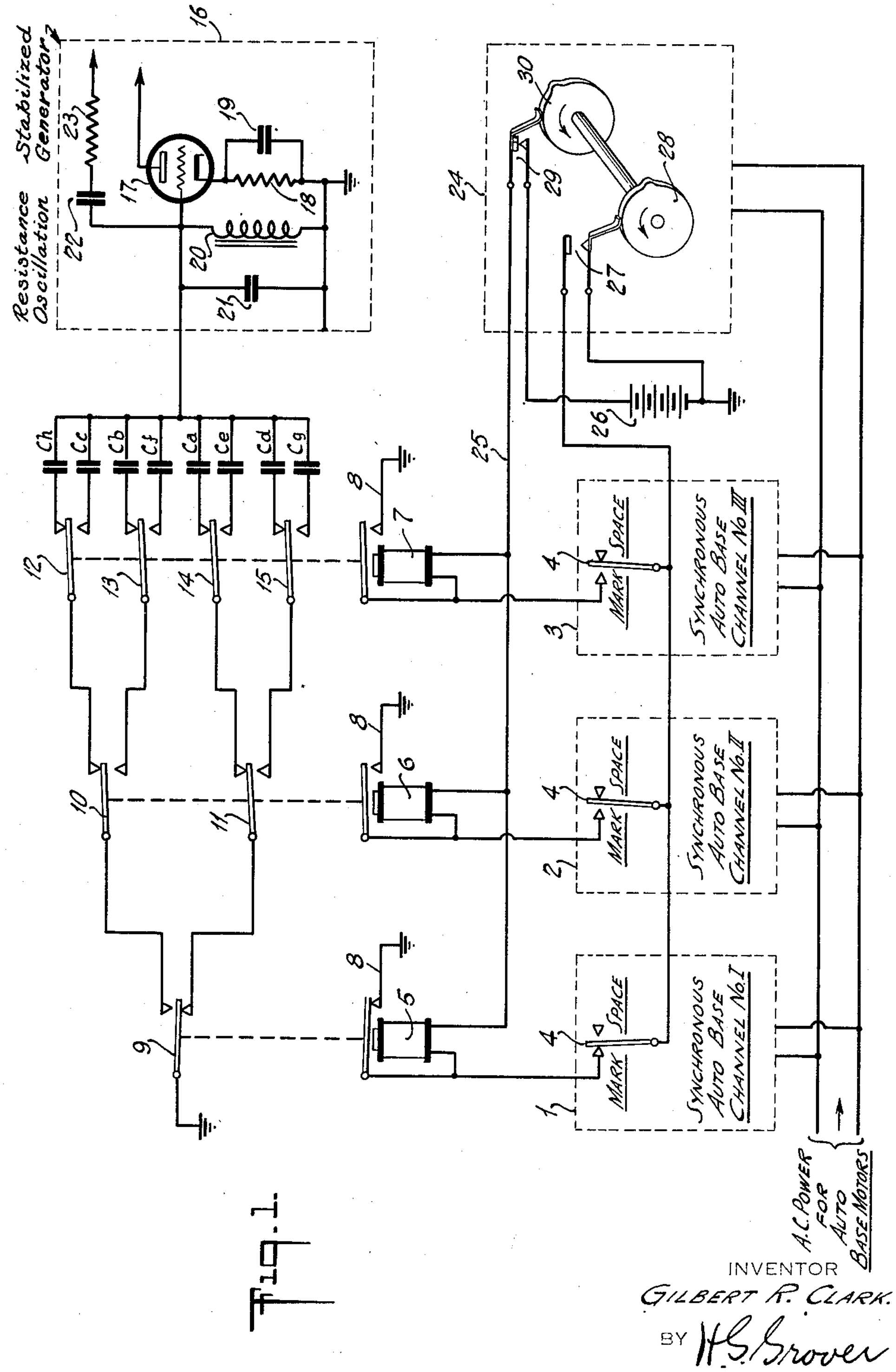

This invention relates to multiplex telegraph systems of the type wherein the coded intelligence is signified by frequency discrimination. The intelligence to be transmitted is translated into trains of signaling pulses which vary in frequency. Each frequency selection possesses a multiplex significance. The mark and/or space conditions occurring simultaneously on different channels of the multiplex system are, therefore, codified by pulses of uniform time duration but of variable frequency characteristic. An important feature of the invention, however, is the arrangement of the transmitting unit for operation on a frequency channel having a relatively narrow band, and the provision of means in the receiving unit for frequency multiplication and for selective filtering of the signals, thereby to assure proper allocation of each signal element to an appropriate responsive device. Such responsive devices are then utilized for interpreting the significance of the frequency-characterized code signals.

It is an object of my invention to provide improvements in systems and methods of frequency discrimination for the purpose of multiplex signal transmission over a relatively narrow band of frequency assignments.

Another object is to provide facilities for expanding the frequency band for the signals as utilized at a receiving station in order to obtain dependable selectivity with regard to the assignment of signals to different multiplex channels.

It is another object of my invention to provide a system of the class described wherein the transmission frequencies are so chosen that they occupy a relatively narrow band, and yet their harmonics do not cause interference on other radio frequency assignments.

It is still another object of my invention to provide a multiplex system having facilities for utilizing a relatively narrow band of transmission frequencies, means being provided at the receiving station whereby the frequency band shall be expanded by the process of frequency multiplication for improving the dependability of the selecting means as required for channel separation.

My invention will now be described with reference to a preferred embodiment, the features of which may be briefly summarized as follows:

As in all multiplex telegraph systems, discrimination between the different channels or trains of signals is made such that different receiving instrumentalities shall be selected for producing the responses corresponding to the keyed signals applied for each channel at the transmitter. Although it is common practice to utilize time division between the signal elements assigned to different channels, in the present case it is only necessary to distinguish one channel from another by employing different frequencies. If, for example, the system is to be set up for three-channel operation, it will be necessary to utilize eight different frequencies for distinguishing the combinations of mark and space conditions which might exist at any instant as between the three channels. The following table will make this matter clear.

| Combination | Channel I | Channel II | Channel III | Frequency Assigned |
|---|---|---|---|---|
| 1 | Mark | Space | Space | $f_a$ |
| 2 | Space | Mark | Space | $f_b$ |
| 3 | Space | Space | Mark | $f_c$ |
| 4 | Mark | Mark | Space | $f_d$ |
| 5 | Mark | Space | Mark | $f_e$ |
| 6 | Space | Mark | Mark | $f_f$ |
| 7 | Mark | Mark | Mark | $f_g$ |
| 8 | Space | Space | Space | $f_h$ |

It is immaterial whether the frequency assignments shown in the table are those of carrier waves which fall within a relatively narrow band, or whether they are tone frequencies which may be used as modulations in keying a given carrier wave.

Figure 2:
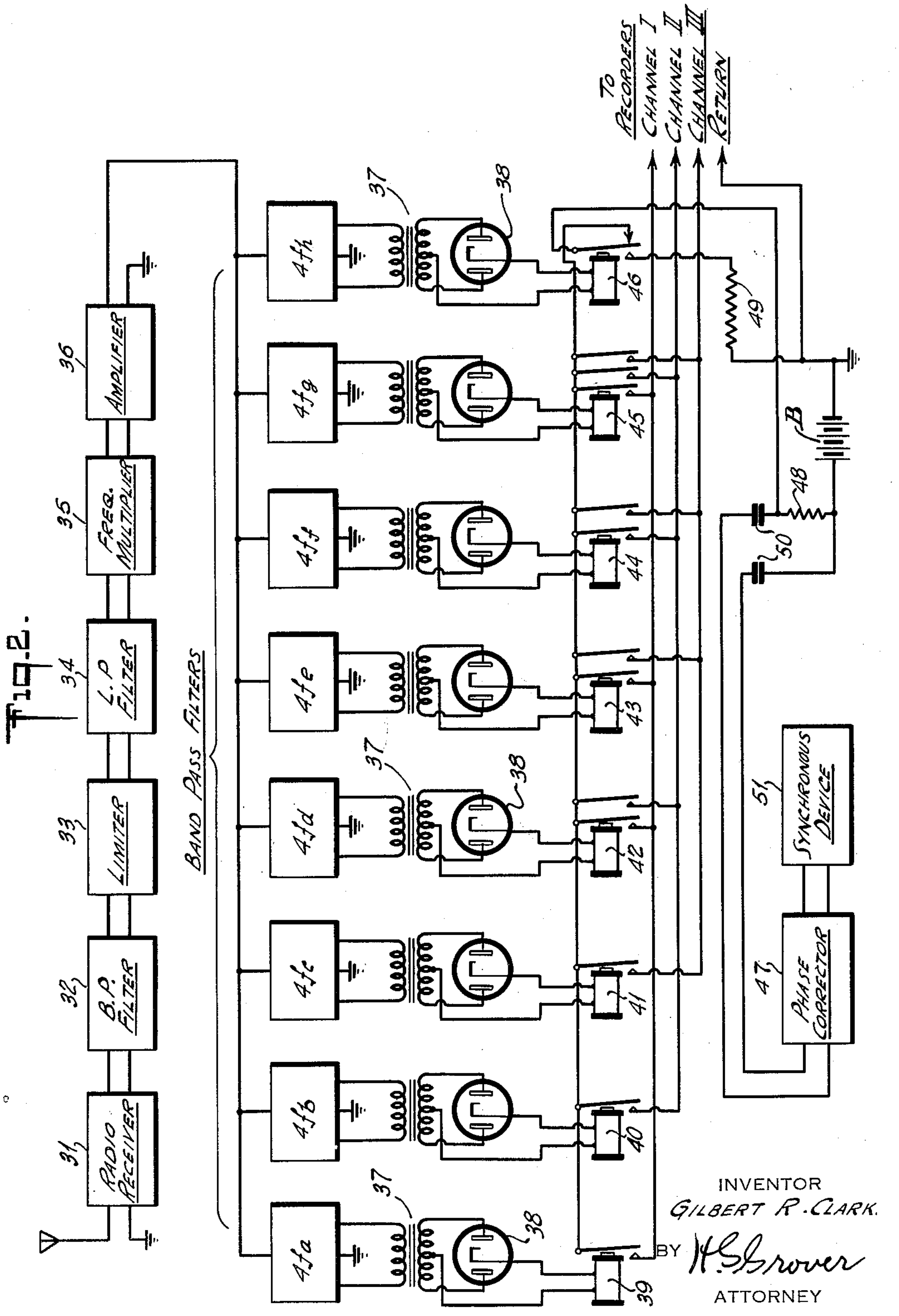

In the accompanying drawing to which reference is made in the ensuing description:

Fig. 1 shows diagrammatically the essential elements of transmitting equipment preferably used in carrying out my invention; and Fig. 2 shows facilities for receiving and filtering signals of varying frequency, and a preferred arrangement for expanding the frequency range so as to provide dependable frequency discrimination.

Referring first to Fig. 1, I show therein an arrangement of three tape keying units 1, 2, and 3 each driven by a synchronous motor or, optionally, all may be driven by a single motor with suitable gear transmissions. In either event the operation of the three keying units would be maintained synchronous and in phase.

In each keying unit is a contact maker 4 connected to a respective one of the relays 5, 6, and 7. Each of these relays possesses a locking circuit 8 connected from one terminal of its winding through its armature to ground.

Relays 5, 6, and 7 have operable contacts in the form of double-pole switches which are interconnected so as to fan out from a ground connection to any selected one of eight different capacitors designated C with different subscripts *a* to *h* inclusive. This arrangement of relay contacts is sometimes called a "Christmas tree." Relay 5 controls a movable contact 9; relay 6 controls two movable contacts 10 and 11; and relay 7 controls four movable contacts 12, 13, 14, and 15. The stationary contacts between which the movable contacts are vibrated may readily be seen to provide the fanning out of the ground connection to different ones of eight condensers of the C-group. It is obvious that when one or more of the relays 5, 6, and 7 are energized different combinations will be set up to select one of the eight condensers C in accordance with the foregoing table for transmitting a designated frequency representing the combination of mark and space conditions on the three different channels.

An oscillation generator is shown in Fig. 1 within the broken line rectangle 16. This unit comprises an electron discharge tube 17 having at least a cathode, a grid, and an anode. The cathode is connected to ground through a cathode resistor 18 shunted by a capacitor 19. The input circuit comprises an inductance 20 in shunt with a capacitor 21 and also in shunt with a selected one of the eight capacitors of the group $C_a$ to $C_h$ inclusive.

The output circuit from the oscillator 16 is one which includes a capacitor 22 in series with a resistor 23. This output may be applied to any suitable radio transmitter for keying the same. The frequency of output is, of course, determined by the particular condenser of the C-group which is selected by the operation of the relays 5, 6, and 7.

In transmitting code signals from perforated tapes, it is, of course, essential that the impulses be sent out in a definite cadence. The synchronous motors by which the tape keyers are operated provide this cadence. It is also essential for the purpose of setting up successive code combinations that the locking circuits of the relays 5, 6, and 7 be periodically opened, that is, after transmitting each baud element of the code signals. Accordingly, I provide a cam-operated switch 24 which enables the relays 5, 6, and 7 to be energized and de-energized synchronously.

In order to provide a working tolerance as to the timing of the code keyers of the different auto heads 1, 2, and 3, I have arranged the keying circuits fed from battery 26 to be passed momentarily through contacts 27 when closed by a cam 28. Each of the relays 5, 6, and 7 when selected by its keyer is locked up. The keying contacts 4 are preferably and conventionally controlled by perforations in different strips of tape fed to the respective keying units. The return circuit 25 is common to relays 5, 6, and 7 and extends therefrom to switch unit 24, wherein contacts 29 are opened by a hump on cam 30. The unlocking operation releases relays 5, 6, and 7 at the end of each baud interval.

Referring now to Fig. 2, I show illustratively an arrangement for receiving the signals which have been composed for transmission in the manner above described. The signals are all received by one receiver 31 and then filtered in the unit 32 for the purpose of reducing interference and harmonic distortion. The output from the filter unit 32 is composed of a train of signal elements each of which possesses one of the frequency characteristics $f_a$ to $f_h$ inclusive, depending upon the channel or channels in which marking bauds occur singly or simultaneously. The signals are then passed to a limiter device 33 which serves to reduce the effects of fading by delivering an output of uniform amplitude. Then follows a low-pass filter unit 34 through which the signals are passed for reshaping so as to deliver only the fundamental frequency component of the signals $f_a$ to $f_h$. If the output from the limiter 33 is of rectangular wave form, the low-pass filter unit serves to restore the sine wave characteristic to the signal potentials of the frequencies $f_a$ to $f_h$. This is important from the standpoint of reducing the effects of harmonic distortion.

Although one frequency multiplier unit 35, following filter unit 34, is shown, it will be understood that this may be followed by further frequency multipliers, if desired. In this way, as many stages of frequency multiplication may be used as are needed in order to obtain the required separation between frequency assignments. The output from the frequency multiplier 35 is then fed to an amplifier 36 and from there to a parallel-connected arrangement of bandpass filters designated $4f_a$, $4f_b$ . . . $4f_h$.

Each frequency discriminating bandpass filter $4f_a$ to $4f_h$ has an output circuit connected to an individual transformer 37. Since all of the translating circuits are alike, a description of the circuit arrangement controlled by signals from bandpass filter $4f_a$ will be sufficient. The secondary of the transformer 37 has a midtap connected through a relay winding 39 to the cathode in a full-wave rectifier 38. The anodes of the rectifier tube are connected to the terminals of the secondary of transformer 37. Upon reception of any given signal, rectification of the selected frequency wave will take place in the rectifier tube 38, thus causing the connected relay to be energized.

Eight relays 39, 40, 41, 42, 43, 44, 45, and 46 are shown, each operable by direct current derived from an appropriate one of the rectifiers 38. The relays respond selectively, therefore, to signals having different frequency characteristics. Relays 39, 40, and 41 have one contact pair each for keying individual recorders in channels I, II, and III. Relays 42, 43, and 44 have two pairs of contacts each because they operate in response to the reception of signal frequencies $f_d$, $f_e$, and $f_f$ respectively, these frequencies denoting the simultaneous occurrence of marking signal elements in two selected channels, as seen from the table hereinabove presented. Relay 45 has three pairs of contacts in order to produce a marking signal response in all three channels upon reception of a signal having the frequency $f_g$. Relay 46 is peculiar in that it is used only upon reception of signals represented by frequency $f_h$, which means that a spacing condition exists in all three channels. Relay 46 is, therefore, arranged to open the common supply lead between battery B and the contact pairs of all the other relays.

Relay 46 has another function, namely, to apply a cadence signal to the phase corrector 47 when such cadence signals are not capable of derivation from the operation of one or another of relays 39 to 45 inclusive. Accordingly, when relay 46 operates, it causes the closing of a front circuit from battery B through a load resistor 48, the armature and front contact of the relay 46 and another load resistor 49 to the negative terminal of source B and ground. The potential drop in resistor 48 is at this time substantially commensurate with the average drop when one or more of the other relays 39 to 45 inclusive have been operated for producing a response in the recorders of channels I, II, III. The phase corrector 47 is uniformly influenced by the potential drop in resistor 48, since it is coupled thereto by capacitors 50. The cadence of transmission of the synchronous signals is thus maintained despite the presence of spacing conditions in all channels simultaneously.

It has been found best to confine the frequency range of the several frequencies $f_a$ to $f_h$ to within a 2:1 ratio in order to lessen the requirements placed upon the low-pass filters.

I have not show specifically any particular type of recording or other responsive device to be used in the different channels I, II, and III, since the principles of operation of my invention are not dependent upon the type of responsive device which is so used. It will be understood, however, that the receiving apparatus may include ink recorders, facsimile recorders, or printing telegraph instrumentalities, depending upon the type of service that is required.

It will be understood further that my invention is capable of expansion to operate on a four-channel multiplex system, or any reasonable number of channels, it only being necessary to provide discriminating frequencies sufficient in number to meet any given condition. For example, if four channels are to be operated, then 16 frequencies will be required. For $n$ channels, the required number of frequencies would be $2^n$ in order to cover all possible combinations of marking and spacing conditions in each channel.

It will be observed that no relay is required to operate at a keying frequency higher than that which would be used in single channel transmission. Since only one frequency exists at any one time, the received signal may be limited, reshaped, and multiplied by the cascaded units 31 to 36 inclusive which are common to all frequencies. Furthermore, the transmitter may be modulated to its full capacity. This permits the use of grid modulation, on-and-off square-wave keying, or other economical signaling technique at the transmitters.

An element of secrecy is inherent in the operation of my improved frequency discriminating signaling system because of the simultaneous representation of different pieces of intelligence in the several channels by means of frequency variations which are not exclusive to a given channel. The translation of the signals can only be obtained by correct allocation of the different frequencies to one or more channels in accordance with the frequency assignments shown in the foregoing table. It is, of course, possible, to change these frequency assignments provided a given schedule is adhered to at both the transmitting and receiving terminals. There are 40,320 permutations of the way the eight frequencies can be assigned to the eight combinations of mark and space. Hence, if secrecy requirements were such that these permutations needed to be changed from time to time, it could readily be arranged to do so.

It will be noted that by the use of frequency multiplication at the receiver and possibly by successive stages of multiplication, the terminal frequencies become further and further removed from each other, yet their sidebands retain the original relationship to their respective frequencies. For example, if the received signals are doubled five times in succession, the frequency assignment will have 32 times the original separation. Obviously, this process if carried far enough enables the frequency assignments not only to be separated but to be separated by the use of inexpensive filters. It will be observed, however, that the frequencies utilized in transmission should be high enough with respect to the keying speed so that in the space of one baud, the frequency that is transmitted may be accurately distinguished as a discrete frequency separate from the others.

My invention is primarily adapted to synchronous transmission of signals as in printing telegraph systems. It is, however, possible to modify the system so that phase correction of the receiving apparatus is unnecessary, particularly where the reception of signals is handled entirely by ink recorders. Even under such conditions, it would be desirable to utilize signal regeneration so as to improve the appearance of the ink record. Usually, however, a regenerative system requires a phase corrector for keeping the reshaped signals in step with the received signals. Regenerative systems are well known and description thereof is unnecessary.

Various modifications of my invention may well be made by those skilled in the art in view of the foregoing disclosure, but without departing from the spirit and scope of the invention itself.

I claim:

1. In a multiplex telegraph receiver, means for receiving incoming signals the purport of which is a composite of intelligence conveyed in a plurality of multiplex channels, the unit elements of said signals being characterized by a different frequency for each permutation of marking and spacing conditions in the respective channels, a plurality of bandpass filters connected in parallel to the output of said receiving means, each filter being arranged to pass a distinct one of the received different frequencies, a plurality of relays each having a winding energized by the output of a corresponding one of said filters, and channel distributing means including contacts operated by said relays functioning to selectively allocate, during each unit element of the signals, the intelligence thereof to one or more of the multiplex receiver channels.

2. In a multiple channel multiplex telegraph system, an oscillation generator having a frequency determining circuit, a plurality of reactors of different reactive values, a connection between one terminal of each reactor and a point on said circuit, a plurality of switches coacting with the other terminals of said reactors and arranged to connect the other terminal of a selected one of said reactors to another point on said circuit, an independent keying unit for each channel, a relay controlled by each keying unit for energization from a suitable source or deenergization in accordance with the intelligence being transmitted through the corresponding channel, each relay operating corresponding switches to connect selected ones of said reactors to said circuit, a locking circuit for each relay operating to maintain such relay energized in response to energization thereof in accordance with the intelligence in the corresponding channel, a common connection from all of the locking circuits to said source, means for periodically opening said common connection to periodically open the locking circuits of all of the relays, and means for transmitting the generated energy.

GILBERT R. CLARK.

(References on following page)

REFERENCES CITED

The following references are of record in the file of this patent:

UNITED STATES PATENTS

| Number | Name | Date |
|---|---|---|
| 1,361,522 | Espenschied | Dec. 7, 1920 |
| 1,661,962 | Robinson | Mar. 6, 1928 |
| 2,276,154 | Byrne | Mar. 10, 1942 |
| 2,291,369 | Boughtwood | July 28, 1942 |
| 2,301,373 | Cox | Nov. 10, 1942 |
| 2,313,209 | Valensi | Mar. 9, 1943 |
| 2,424,243 | Lowell | July 22, 1947 |

FOREIGN PATENTS

| Number | Country | Date |
|---|---|---|
| 708,641 | France | July 27, 1931 |

OTHER REFERENCES

American Standard Definitions of Electrical Terms, definition of the word "baud" (on page 229).

British Standards 204, glossary of terms used in tele-communication, definition of the word "baud."

Webster's International Dictionary, 2nd edition, definition of the word "baud."